US010433536B2

(12) United States Patent
Marks et al.

(10) Patent No.: US 10,433,536 B2
(45) Date of Patent: *Oct. 8, 2019

(54) ANIMAL TRAP WITH SIMPLIFIED, HIGH SPEED OPERATION

(71) Applicants: Joel S. Marks, Sherman Oaks, CA (US); Surapon Arleekul, Sherman Oaks, CA (US)

(72) Inventors: Joel S. Marks, Sherman Oaks, CA (US); Surapon Arleekul, Sherman Oaks, CA (US)

(*) Notice: Subject to any disclaimer, the term of this patent is extended or adjusted under 35 U.S.C. 154(b) by 61 days.

This patent is subject to a terminal disclaimer.

(21) Appl. No.: 15/701,044

(22) Filed: Sep. 11, 2017

(65) Prior Publication Data

US 2017/0367319 A1    Dec. 28, 2017

Related U.S. Application Data

(63) Continuation-in-part of application No. 15/674,524, filed on Aug. 11, 2017, now Pat. No. 10,058,088, which is a continuation of application No. 14/630,327, filed on Feb. 24, 2015, now Pat. No. 9,730,437.

(60) Provisional application No. 61/947,341, filed on Mar. 3, 2014.

(51) Int. Cl.
    *A01M 23/18*    (2006.01)

(52) U.S. Cl.
    CPC ............................. *A01M 23/18* (2013.01)

(58) Field of Classification Search
    CPC ...... A01M 23/16; A01M 23/18; A01M 23/20; A01M 23/22

USPC ............................................... 43/61, 62
See application file for complete search history.

(56) References Cited

U.S. PATENT DOCUMENTS

| 100,986 | A | 3/1870 | Corning |
| 130,667 | A | 8/1872 | Smith |
| 146,887 | A | 1/1874 | Doremus |
| 181,105 | A | 8/1876 | Rice |
| 253,907 | A | 2/1882 | André |
| 298,361 | A | 5/1884 | Erling |
| 363,536 | A | 5/1887 | Oliver |

(Continued)

FOREIGN PATENT DOCUMENTS

| CA | 2388534 A1 * 12/2002 ............ A01M 23/02 |
| DE | 19857452 A1    6/2000 |

(Continued)

OTHER PUBLICATIONS

PCT/US2015/017743 ISR and Written Opinion dated May 20, 2015.
CN, 201580022492.7 Office Action, dated Nov. 16, 2017.

*Primary Examiner* — David J Parsley
*Assistant Examiner* — Danielle A Clerkley
(74) *Attorney, Agent, or Firm* — Paul Y. Feng; One LLP (57) ABSTRACT

A live animal trap with improvements to ease of use, reliability and cost is disclosed. A simple repeatable one-hand set action unlocks both a primary and a secondary lock and lifts a front entry door. A hold-close assembly trips to secure the front door without sliding motions. A low friction latch and trip links thereto provide consistent set action resistant to shaking and undesired trip. A changeable torque arm and preload provides adjustable trip force. A trip tray is spaced above a floor to require a small set-up motion to access the bait and further ensure trip.

20 Claims, 5 Drawing Sheets

(56) References Cited

U.S. PATENT DOCUMENTS

| | | | |
|---|---|---|---|
| 383,972 A | 6/1888 | Mittler |
| 441,677 A | 12/1890 | Lovell |
| 589,802 A | 9/1897 | Smock |
| 844,517 A | 2/1907 | Haas |
| 866,987 A | 9/1907 | Turner |
| 884,380 A | 4/1908 | Hadley |
| 1,020,448 A | 3/1912 | Recko |
| 1,024,278 A | 4/1912 | Niederlitz |
| 1,139,849 A | 5/1915 | Collins |
| 1,181,044 A | 4/1916 | Stringfellow |
| 1,261,189 A | 4/1918 | Tremble |
| 1,261,899 A | 4/1918 | Borszcz |
| 1,283,232 A | 10/1918 | Lewis |
| 1,294,364 A | 2/1919 | Bales |
| 1,297,893 A | 3/1919 | Nash |
| 1,305,054 A | 5/1919 | Blevins |
| 1,318,246 A | 10/1919 | Underwood |
| 1,407,909 A | 2/1922 | Wyskwarko |
| 1,410,738 A | 3/1922 | Dorseth |
| 1,453,795 A | 5/1923 | Hovell |
| 1,453,796 A | 5/1923 | Hovell |
| 1,645,444 A | 10/1926 | Moore |
| 1,728,701 A | 9/1929 | Sholin |
| 1,747,380 A | 2/1930 | McCully |
| 1,990,861 A | 2/1935 | Exum |
| 2,038,068 A | 4/1936 | Wagner |
| 2,129,594 A | 9/1938 | Shimamoto |
| 2,155,006 A | 4/1939 | Cooper |
| 2,156,213 A | 4/1939 | White |
| 2,167,291 A | 7/1939 | Bowman |
| 2,232,604 A | 2/1941 | Helmick |
| 2,257,246 A | 9/1941 | Rudolph |
| 2,284,867 A | 6/1942 | Harris |
| 2,387,811 A | 10/1945 | Smith |
| 2,440,570 A | 4/1948 | Bourgeois |
| 2,447,147 A | 8/1948 | Warner |
| 2,485,319 A | 10/1949 | Rosen |
| 2,488,202 A | 11/1949 | Kern |
| 2,502,836 A | 4/1950 | Eggering |
| 2,524,504 A | 10/1950 | Woolworth |
| 2,540,418 A | 2/1951 | Bird |
| 2,562,809 A | 7/1951 | Mogren |
| 2,586,110 A | 2/1952 | Stilborn |
| 2,589,002 A | 3/1952 | Vonada |
| 2,598,007 A | 5/1952 | McCormick |
| 2,611,989 A | 9/1952 | Larson |
| 2,620,589 A | 12/1952 | Jones |
| 2,692,453 A | 10/1954 | Wingfield |
| 2,717,471 A | 9/1955 | Sullivan |
| 2,752,722 A | 7/1956 | Gardner |
| 2,774,175 A | 12/1956 | Maddocks |
| 2,793,464 A | 5/1957 | Bird |
| 2,803,918 A | 8/1957 | Hall |
| 2,825,176 A | 3/1958 | Floied |
| 3,113,395 A | 12/1963 | Kuren |
| 3,174,250 A | 3/1965 | Gilbert |
| 3,190,030 A | 6/1965 | Gilbaugh |
| 3,394,487 A | 7/1968 | Wood et al. |
| 3,624,951 A | 12/1971 | Gilbaugh |
| 3,823,504 A | 7/1974 | Dosch |
| 3,834,063 A | 9/1974 | Souza et al. |
| 3,913,258 A | 10/1975 | Souza et al. |
| 3,975,857 A | 8/1976 | Branson et al. |
| 4,080,749 A | 3/1978 | Gilbaugh |
| 4,159,590 A | 7/1979 | Palfalvy |
| 4,162,588 A | 7/1979 | Wyant |
| 4,179,835 A | 12/1979 | Hunter |
| 4,232,472 A | 11/1980 | Muelling |
| 4,254,976 A | 3/1981 | Shoberg |
| 4,335,535 A | 6/1982 | Lindley |
| 4,341,033 A | 7/1982 | Siegel |
| 4,342,172 A | 8/1982 | Guanci |
| 4,546,568 A | 10/1985 | Seyler |
| 4,557,067 A | 12/1985 | Ha |
| 4,590,704 A | 5/1986 | Volk |
| 4,682,440 A | 7/1987 | Hunter |
| 4,682,441 A | 7/1987 | Straver |
| 4,685,245 A | 8/1987 | LaPier |
| 4,707,943 A | 11/1987 | Benigno |
| 4,829,700 A | 5/1989 | Ha |
| 4,829,701 A | 5/1989 | ImBrogno |
| 4,899,484 A | 2/1990 | Morin |
| 4,912,872 A | 4/1990 | Wynnn et al. |
| 5,329,723 A | 7/1994 | Liul |
| 5,345,710 A | 9/1994 | Bitz |
| 5,615,514 A | 4/1997 | Meade, Jr. |
| 5,778,594 A | 7/1998 | Askins et al. |
| 5,845,432 A | 12/1998 | Tully et al. |
| 5,862,624 A | 1/1999 | Askins |
| 5,864,982 A | 2/1999 | Tully et al. |
| 6,029,393 A | 2/2000 | Stewart |
| 6,164,008 A | 12/2000 | Kelley |
| 6,484,436 B1 | 11/2002 | Chang |
| 6,543,179 B1 | 4/2003 | Lee |
| 6,588,139 B2 | 7/2003 | Kao et al. |
| 6,609,327 B2 | 8/2003 | Stoico et al. |
| 6,618,982 B2 | 9/2003 | Lafforthun |
| 6,658,788 B1 | 12/2003 | Steinfest |
| 6,834,460 B1 | 12/2004 | Liu |
| 6,938,368 B2 | 9/2005 | Guidry |
| 6,990,767 B1 * | 1/2006 | Margalit ............... A01M 23/20 43/61 |
| 7,370,451 B2 | 5/2008 | Rich et al. |
| 7,540,109 B2 | 6/2009 | Hall |
| 7,757,427 B2 | 7/2010 | Bucher |
| 7,793,460 B2 | 9/2010 | Ha |
| 8,046,953 B2 | 11/2011 | Radesky et al. |
| 8,230,641 B2 | 7/2012 | Rich et al. |
| 8,250,802 B2 | 8/2012 | Radesky et al. |
| 8,359,783 B1 | 1/2013 | Kamery et al. |
| 9,730,437 B2 * | 8/2017 | Marks ................ H05K 999/99 |
| 2002/0035801 A1 | 3/2002 | Ogura |
| 2008/0115405 A1 | 5/2008 | Bucher |
| 2011/0005122 A1 | 1/2011 | Bucher |

FOREIGN PATENT DOCUMENTS

| | | | |
|---|---|---|---|
| FR | 2728141 A1 | 6/1996 | |
| FR | 2783399 A1 * | 3/2000 | ............ A01M 23/18 |
| GB | 2193425 A | 2/1988 | |
| GB | 2216764 A | 10/1989 | |
| GB | 2258381 A | 2/1993 | |
| WO | 0209502 A1 | 2/2002 | |

* cited by examiner

ANIMAL TRAP WITH SIMPLIFIED, HIGH SPEED OPERATION

CROSS-REFERENCE TO RELATED APPLICATIONS

This is a Continuation-In-Part (CIP) application claiming priority from co-pending application Ser. No. 15/674,524, filed Aug. 11, 2017, which is a continuation of application Ser. No. 14/630,327, filed Feb. 24, 2015, now U.S. Pat. No. 9,730,437, which claims benefit of priority from provisional application No. 61/947,341, filed on Mar. 3, 2014, the contents of all of which are hereby incorporated by reference.

FIELD OF THE INVENTION

The present invention relates to live catch animal traps. More precisely, the invention relates to improvements in efficiency and ease of use of such traps.

BACKGROUND

Cage traps typically include a selectively open end to allow or prevent passage of a target animal into the enclosure of the cage. A door is mounted to an end either pivotally or slidably. A latch or similar structure holds the door in a set, open position. Bait is normally placed within the cage to entice the animal to enter the cage and press or move a trigger structure. The trigger is linked to the door latch whereby motion of the trigger or equivalent actuator causes release of the door to move from a door open position to a closed position.

SUMMARY OF THE INVENTION

In various preferred embodiments, the present invention is directed to a cage trap that includes a top, sides, a front door, a rear, and a bottom to form an enclosure for an animal, the top including a ceiling facing an interior of the enclosure. The front door is pivotally attached at the ceiling and includes a raised position and a lowered position, the raised position exposes an interior of the cage to allow animal access into the enclosure while the lowered position confines the interior of the cage to block an animal from exiting from the enclosure. A hold-close assembly connects the ceiling to the door and may include a two bar link with an upper bar pivotally attached at the ceiling at a separate and spaced first location from the pivotal attachment of the front door. The upper bar is pivotally attached to a lower bar at second movable location, and the lower bar is pivotally attached to the door at a third movable location. The lower bar of the hold close assembly is below the ceiling and folded or compacted to extend adjacent to the upper bar in the door raised position. The bars of the hold-close assembly unfold or extend as the door moves toward the lowered position where the unfolded position has the hold close assembly extending from the ceiling down to a lower location of the door. The hold-close assembly trips to secure the front door without sliding motions. An optional secondary lock unobtrusively further secures the hold-close assembly.

A low friction latch and trip links thereto provide consistent set action resistant to shaking and undesired trip. An optional rear door is fitted next to a bait location to allow near vertical access for bait placement and unattended, unobstructed, consistent release with minimal time and environmental effects. A changeable torque arm and spring preload provides adjustable trip force. A trip tray holding the bait is spaced above a floor to require a small set-up motion to access the bait and further ensure trip. An optional bait hook holds bait visibly above the tray and is connected to the tray to provide a second or redundant structure for tripping the trap.

DETAILED DESCRIPTION OF THE PREFERRED EMBODIMENTS

Figure 1:
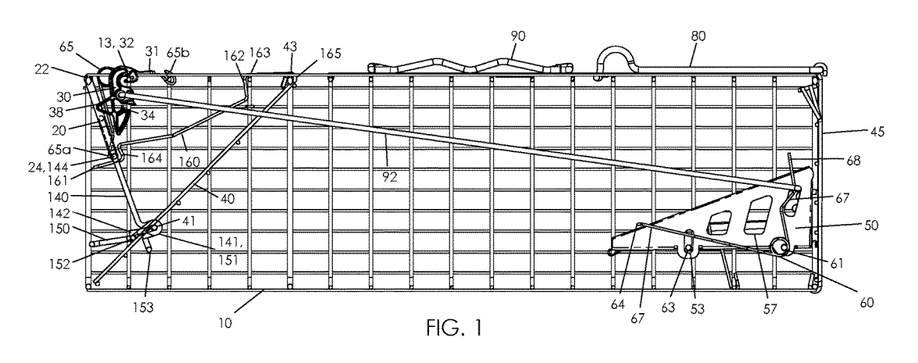
FIG. 1 is a side elevational view of the cage trap in a secure, closed door position according to a preferred embodiment of the invention.
Figure 4:
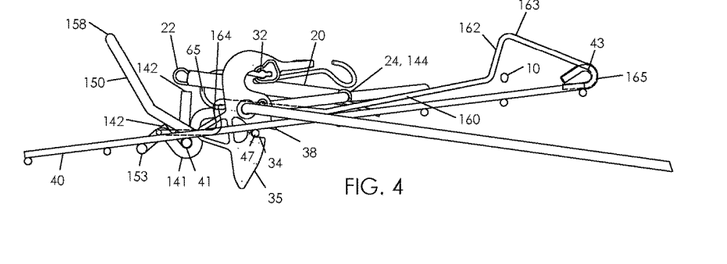
FIG. 4 is the detail view of FIG. 2 with the door fully raised and set.

In an animal trap, the operation thereof should be simple, repeatable and secure. However, this has not been the case. The present invention in various preferred embodiments includes improvements to the ease of use, effectiveness, size and cost for a live animal trap. As seen in FIGS. 1, and 4 an entry door, shown as a front door, is hinged to a cage and includes an open set position near a top of the cage and a lower position pivoted toward the bottom of the cage. In the open position, a spring biased pivotal latch selectively holds the door wide open near parallel to the cage ceiling. The latch includes a cam surface to momentarily engage the door or equivalent closely linked structure whereby as the front door is lifted to the set position, the latch passively snaps into place under the spring bias. This set action is well defined, repeatable and allows the user to merely lift the front door with a single hand by a lift handle described below.

In conventional traps, the manner in which a door-setting latch mechanism is set can affect the trip force. Further, the trip force may be affected by the duration of the set condition; for example, various weather conditions can change surface characteristics of moving trip features whereby the latch becomes relatively stuck or slippery in the set condition. Some traps are inherently subject to variations in trip force from complex or high friction designs. When the trip force is too low the door will shut inadvertently, for example, from the wind or an animal walking atop or next to the trap. Another cause of undesired trips can occur when the trap is moved to another location in the set condition. With too high a trip force, the animal will take the bait and walk back out freely. Users have been known to connect a string and trip a trap manually as the target enters when the trip force is too high. Such poor function defeats the expected feature of unattended use. Further users are known to make frequent adjustments or fixes to conventional traps to get them to operate as expected.

Typically, the trip force is not adjustable or such adjustment is not effective or convenient. If the local target animal is of differing weight from the factory trip setting, for example, lighter than expected, the bait will be removed by the animal while the door stays open. Similarly, if an untargeted animal is light weight, it can be useful to adjust the trip force higher. For example, if the target is squirrels but unintended rats and birds are also being caught, a higher trip force is indicated. However, this sort of selectivity requires a repeatable and consistent trip action that has not been available.

A cage trap normally includes a lock to secure a door closed upon a trip event. The lock may include only a primary lock or both a primary and a secondary lock. For example, the secondary lock may comprise an engageable detent feature upon the primary lock. The novel primary lock of the preferred embodiments of the present invention have been demonstrated to be effective. A secondary lock can ensure the entry door remains shut even if the primary lock is accidentally released, the trap is dropped in certain ways, or is not fully secured for any reason. However, prior secondary locks with prior primary locks have required awkward extra actions to release both locks or were not reliable. In the preferred improvements disclosed herein, a secondary lock is released with the primary door opening action. The secondary lock normally operates by a separate mechanical action from an action upon the primary lock, while the secondary lock release occurs within a same user hand motion as the primary release. The double action retains the one-hand convenience of an automatic unlock with door opening while adding a second layer of security to the door closure.

Figure 7:
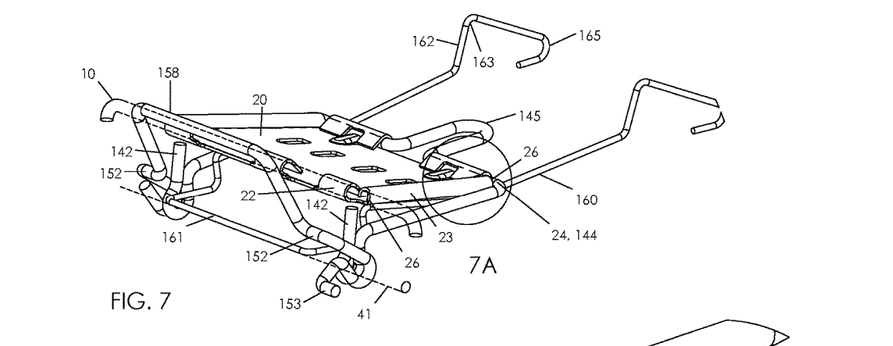
FIG. 7 is the assembly of FIG. 5 in a fully opened and set position.
Figure 8:
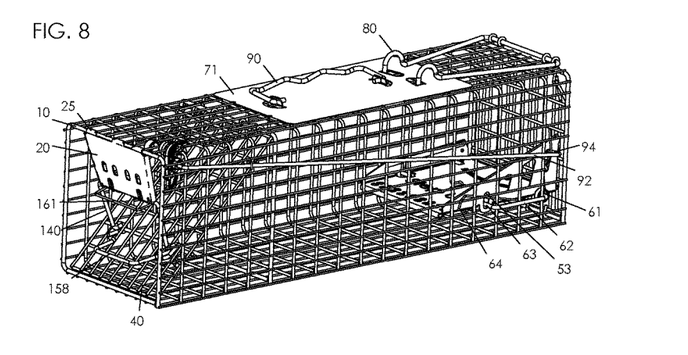
FIG. 8 is a top front perspective view of the cage trap of FIG. 1.

The present invention in various preferred embodiments is shown in the drawing figures and includes improvements to the ease of use, effectiveness, size and cost for a live animal trap. As seen in FIGS. 1 and 8, an entry door, shown as a front door, is hinged to a cage and includes an open set position, FIGS. 4, 7 and 12, near a top of the cage and a lower position pivoted toward the bottom of the cage. In the open position, a spring biased pivotal latch 30 selectively holds the door wide open near parallel to the cage ceiling. The latch includes a cam surface 35 to momentarily engage the door or equivalent closely linked structure whereby as the front door is lifted to the set position, the latch passively snaps into place under the spring bias without a separate user action. This set action is well defined, repeatable and allows the user to merely lift the front door with a single hand by a lift handle described below.

The front door includes a hold-close assembly. The assembly is biased, preferably by a spring element or additively or alternatively by gravity, to move the front door downward or other closed or lowered position. The assembly is substantially entirely below the ceiling of the cage whereby the top of the cage remains relatively flat for efficient storage and shipping of the trap while the assembly acts substantially from above the front door. The assembly includes an upper link or bar pivotally attached at a link first end at or near the ceiling of the cage. A lower link is pivotally attached to the upper link at a spaced position from the lever first end. The lower link or bar is further pivotally attached to the front door. The upper and lower link together are respectively a two-bar link comprising three linked pivot hinges to form the hold-close assembly. The upper and lower links are partially overlapped and folded near parallel in the upper door set position. Similarly, the front door is preferably substantially parallel to the upper link and lower link in the set position. Such parallel or equivalently stacked elements provide a compact trap structure that fits largely within a space above the front door, between a vertical level of portions of the door and the ceiling, and preferably not higher than the ceiling of the cage. Incidental parts of the hold close assembly may extend above the ceiling. As the door closes the upper and lower link spread apart, unfolding to become again near parallel. In the preferred embodiment, the hold-close assembly pivots inward whereby it does not extend past a front end of the door in the set position as shown for example in FIG. 12. In this manner, the hold-close assembly is fully internally stowed and does not increase a size of the trap while the trap is set.

The assembly includes a stop to limit pivoting motion of the hold close assembly and lower link of the primary lock at the door closed position. This stop occurs as the three hinges move past an aligned position to a slightly misaligned position. This may form an over-center mechanism similar to a locked knee wherein a leg is extended and stable to hold the body up. In the over center position the primary lock prohibits opening the door and the lock must be unlocked to enable opening the door. This assembly preferably operates primarily through pivoting hinge motions with sliding actions limited to that within such hinges. With negligible sliding and short lightweight elements, the hold-close assembly is efficient and the front door closes rapidly with a light bias force and opens to set with minimal effort. The bias force and/or an optional detent latching structure, such as a secondary lock, on the hold-close assembly secures the door shut in the closed position. It is possible that the primary lock cannot or should not move fully to the over center position or equivalent position. In this case the primary lock singly may provide a locking function according to its function as a hold-close structure even as it is limited to inhibiting or interfering with rather than prohibiting opening of the door.

The trap includes a trip tray. For convenience, the trip tray will be called as such, or just a tray, but is not exclusive of a tray and may be other equivalently functioning structures such as a platform, plate, disk, channel, bar, button, dip, cup, ring, strip, or the like.

It is preferable to have a trap that is long enough that the front door or equivalent closure shuts fully without hanging up on the animal before becoming secure. For this reason, a front, or equivalent triggered, door that is hinged at its rear end near the top of the cage is normally preferred. Such a door closes inward from above to help bump the animal inward in the case of any door interference. Another method to ensure the front door is clear is a longer or deeper trap whereby the bait location is farther from the door. But a more compact trap is inherently desirable for cost and convenience. A design that gets the animal as rearward as possible and shuts quickly will allow a most compact practical trap. Further, to operate reliably the force to trigger the door closing should be repeatable as seen in the present invention. Such closing forces due to a myriad of issues mentioned above (e.g., environment, rust, dirt, friction, etc.) are not predictable in prior designs.

To provide an effectively long trap, the trip tray is pivotally attached at a rear of the cage, preferably having a rear adjacent to a rear door or rear extent of the cage so that bait can be placed far away as possible from the front door. The tray normally extends forward, spaced above the cage bottom by, for example, about an inch for a typical rodent-sized cage. The pivotal mounting is preferably similarly spaced above the floor so the tray can be substantially horizontal with respect to a side view. The bait is normally placed on the rear of the tray near the tray pivot location since the tray extends to the rear of the cage. This contrasts with prior designs where the bait is normally placed on the cage floor between the rear end of the cage and a centrally positioned trip plate. The bait does not need to be placed on the rear floor of the cage since the floor there is covered by the tray. In operation, the animal enters the front of the cage and walks to the rear to access the bait. Doing so requires the animal to step up a small distance to rise onto the tray whereby the tray moves downward. This is a natural action that ensures the animal will not just extend its neck over the tray (over-necking) to get the bait but rather steps all the way back to the end of the cage. Empirical observations have shown this step-up structure to be an unexpected improvement against bait stealing even when applied to conventional traps. When combined with the further improvements disclosed herein, escapes and false trips are substantially eliminated. By having the tray raised, the bait is also raised so it is easily visible to the animal.

An additional bait holding and trip means may be included. Such means may be a hook that holds bait above the tray to better expose the bait. The hook may further be linked to the latch whereby moving the hook by pulling on the bait for example will trip the door. The trip hook may be movably linked to the tray. In this manner, the trap can be tripped even by a very low weight animal through the separate action of pulling the bait.

For example, if a small mouse is otherwise stealing bait without trip the mouse will tend to pull on the bait hook while standing on the tray. The weight on the tray plus the force on the hook will ensure the mouse trips the door. This function has been empirically demonstrated wherein a mouse or small rat repeatedly stole bait without trip until a hook as described was fitted. Even if the mouse is not the target the trap can be repeatedly neutralized to the target by having no bait from the mouse's actions.

The trip tray includes an optional flange preferably bent upward from the base extending partially toward the ceiling above the pivot location. This flange creates a vertical torque arm that operates pivotally on a link to the front door latch where the arm preferably terminates below the cage ceiling. When the trip tray pivots downward, the flange pushes the link forward to pivot the latch and release the front door. In addition to being simple, this arrangement is low friction with no substantial sliding. The tray is held in the set position primarily from a bias spring preferably operating on the tray. This preferably single spring provides both functions to hold the latch in the set position and the trip tray in its upper position and reliably controls the trip force though the low friction system. Of course, additional springs and locations thereof may be used for these functions.

The pivot location of the trip tray is preferably forward from the rearmost location of the tray while the trip tray extends rearward of the hinge to the rear end of the cage. In this way, the cantilevered front end is counter balanced to an extent by the rear overhang. This reduces tendency for false trips upon vertical motion to the cage as may occur, for example, when moving the set trap to nearby locations or animal bumping, while keeping the tray long enough to prevent over-necking.

The link from the trip tray to the latch may include an adjustable vertical position on the flange. In this arrangement, according to one embodiment, the torque arm can be changed to reduce or increase the trip force. There is no change to the pivot location of the tray so the motion of the trip action does not change when the trip force is changed. These are unexpected results of the present invention arrangement. As disclosed herein according to a further embodiment adjusting the link as described may deflect the bias spring to change the preload and thus the trip force.

As preferably a humane trap, the material of the cage is preferably designed so that the target animal cannot extend its nose outside; in particular that it cannot easily bite the wire of the cage mesh. In an example of a squirrel, a 1"×1" mesh allows the animal to injure its snout or nose area as it bites the wire as has been empirically observed. Therefore, a ½"×1" or similar mesh is preferred in this example. However, the same heavy wire used for the 1"×1" mesh may be costly or too obstructive when used in the smaller mesh size. Therefore, the mesh may use differing wire diameters in regular intervals along the cage walls. For example, there may be a vertical 0.090" wire at 1" spacing with a 0.055" horizontal wire at ½" spacing. Or there may be every third wire is 0.090" with intervening wires at 0.055" for a given orientation of the wires. These spacing and diameter dimensions may be scaled according to the trap size and target animal size and weight.

An optional carrying handle structure in a preferred embodiment has a single wire form with a wavy gripping portion that normally rests atop the cage. The slightly raised segments provide a convenient area to grasp the handle and pull it up to its operative position without substantially raising the height of the trap structure. Conventional straight handle wires lie flat on top and are difficult to initiate a lift into position. In a further option, the handle includes a wire form with a three-dimensional path to provide multiple hand pressing points to improve user comfort over a single wire form. Such a handle also is easier to grasp and pivot up to its operational position from a lying position on the cage top. Such a three-dimensional wire may be less costly than a molded handle and provides a unique and attractive visual appearance.

FIG. 1 shows a closed-door position for a preferred embodiment of the invention. Front door 40 pivots about top hinge 43. As shown, hinge 43 is a loop of the wire of door 40. Upper link 20 and lower link 140 form at least part of a hold-close assembly. Front door 40 is at or near its lowest position and upper link 20 with lower link 140 are fully unfolded. Door spring 65 preferably provides a bias to cause this rapid motion. Door spring 65 is a torsion spring lower arm 65a pressing a lower location on upper link 20, near hinge 24. Upper spring arm 65b presses a ceiling of cage 10.

Upper link hinge 22 cooperates with cage 10, at or near the ceiling thereof, while upper link hinge 24 pivotally mates to lower link 140 toward a central area of the hold-close assembly. At a lower end of the hold-close assembly, lower hinge 141 of link 140 mates to front door 40 at wire 41. Upper hinge 22 is preferably substantially laterally aligned, vertically above in FIG. 4, with lower hinge 141 in the set position. Such alignment facilitates the laterally and vertically compact structure of the hold-close assembly. Lower hinge 141 maintains a continuous connection with no engagement event to door 40 required for a reliable and robust securing action and smooth opening action. Specifically, hinge 141 is always pivotally mated to door 40. Selective disengagement may be provided if certain clearances or geometries are desired. Upper link 20 may be preferably made of formed sheet metal while lower link 140 is a wire form.

The hold-close assembly as seen in the profile view of FIG. 1 is below a ceiling of cage 10. For example, hinges 24 and 141 are spaced below the ceiling through their respective operating positions. Hinge 22 of upper link 20 is about coincident with a ceiling of cage 10. Optionally, incidental elements of upper link 20 may extend higher than shown.

Figure 2:
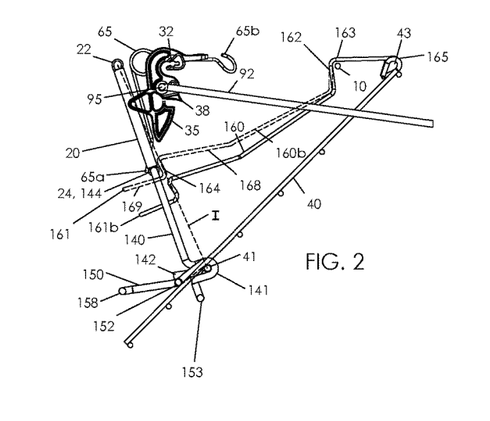
FIG. 2 is a detail view of a latch and trip assembly in an initial opening operation with a secondary lock disengaged, wherein the cage is not shown for clarity.
Figure 3:
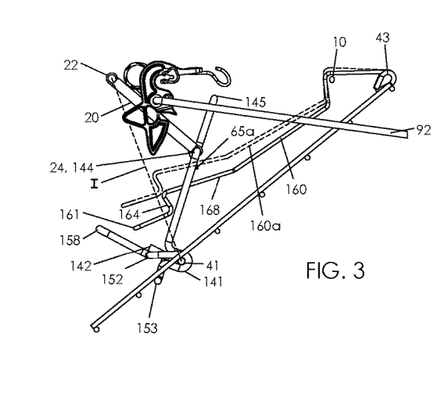
FIG. 3 is the detail view of FIG. 2 with the door partly opened.

In the set and intermediate positions pivot 24 is behind an imaginary line (line I in FIG. 3), connecting upper hinge 22 to lower hinge 141, see FIGS. 2 and 3. In the closed position, FIGS. 1 and 2, pivot 24 moves to be near, at, or in front of the imaginary line. The closed position is thus stable whereby a force from a captured animal or shaking of the cage will not allow the door to open. Whether pivot 24 is in front or near to the imaginary line the resilient force from door spring 65 holds the door in the closed and primary locked condition.

Figure 5:
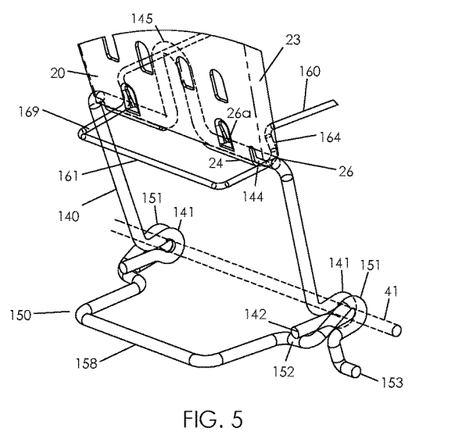
FIG. 5 is a detail front perspective view of a door lock assembly in a locked position.
Figure 9:
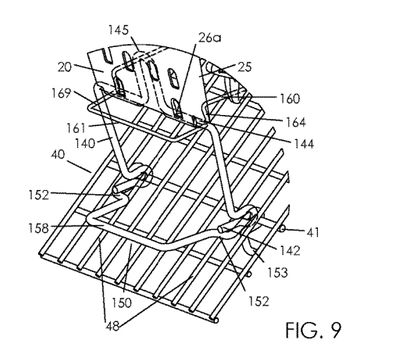
FIG. 9 is the view of FIG. 8 with the front door shown in detail.
Figure 10:
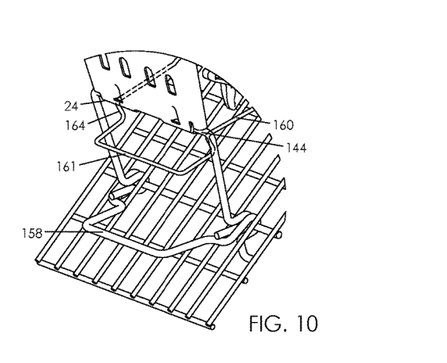
FIG. 10 is the view of FIG. 9 with the second lock disengaged.

In FIGS. 5 and 9, stop limit 145 of lower link 140 presses or engages upper link 20 to hold the closed condition. If pivot 24 is slightly in front of the imaginary line as shown in FIG. 2 then the hold-close assembly will be stable against opening forces up to the mechanical limits of the door and hold-close structures. With upper link 20 and lower link 140 being opposed about hinges 24 and 144, stop limit 145 may alternately be part of upper link 20 to contact lower link 140 below the hinges. Stop limit 145 may equivalently be located between elements of the hold-close assembly as shown at or either of cage 10 or front door 40

Figure 12:
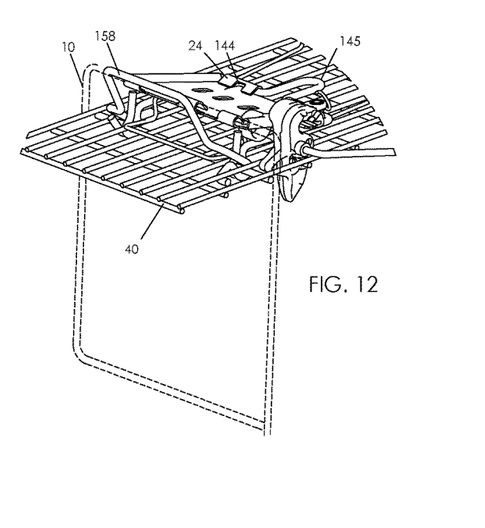
FIG. 12 is the view of FIG. 9 with the door in the fully opened and set position.

As seen in FIG. 12, the hold-close assembly is folded behind the cage front end, to the right in the view. Note the position of hinge 24 relative to the front cage 10 ring wire shown in phantom. It is contained within the length defined by open door 40 and thereby does not increase the length of the trap beyond door 40 when set. Optionally, the hold-close assembly may fold in a forward direction as disclosed in U.S. Pat. No. 9,730,437, the contents of which are incorporated herein by reference.

Figure 7A:
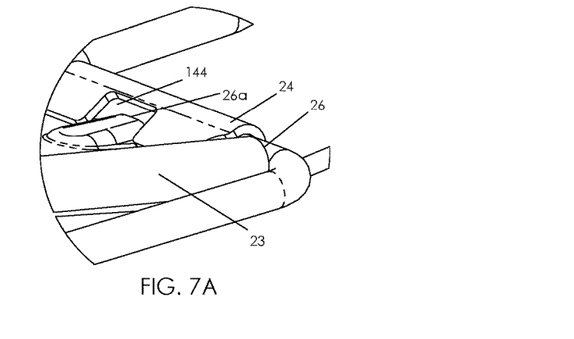
FIG. 7A is a detail view of a hinge area of FIG. 7.

Upper link 20 preferably includes sturdy structures to withstand the forces that can occur against the closed door of FIG. 5. In its preferred sheet metal form, upper link 20 includes roll edges 23, FIGS. 5, 7 and 7A. These edges terminate at upper and lower ends 26. Roll edge 23 thus forms a rigid pipe that contacts hinge 144 of the lower link to hold the lower link away from the cage ceiling in FIG. 5. A further reinforcement includes embossed lance 26a, FIGS. 5 and 7A, with an edge that also contacts hinge 144. Hinge elements 22 and 24, FIG. 7, are flanges that provide tensile positioning for the assembly; these do not need to resist animal escape forces on door 40.

Figure 6:
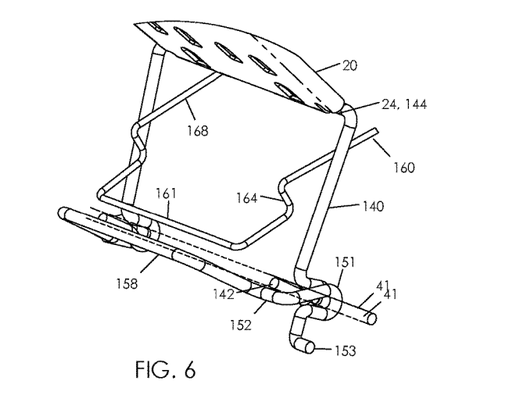
FIG. 6 is the assembly of FIG. 5 in a partly opened position.
Figure 11:
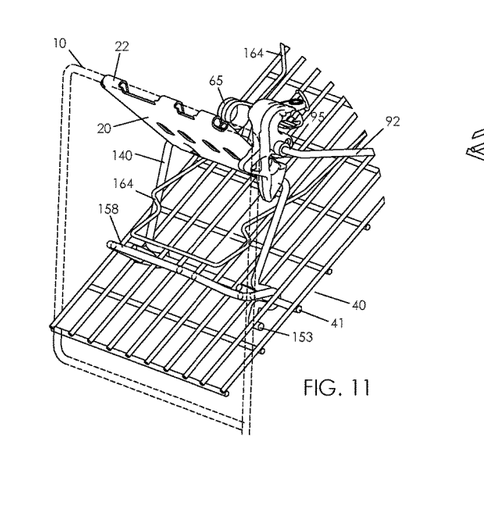
FIG. 11 is the view of FIG. 9 with the door in the partly opened position.

To disengage the primary lock of the hold-close assembly, the assembly is moved from the locked position for example of FIGS. 1, 2 and 5 to the intermediate position of FIGS. 3, 6 and 11. The assembly then continues toward the fully open and set positions of FIGS. 4, 7, and 12. The hold-close assembly can be directly pressed through these positions upon upper link 20, for example. The space available to press from becomes limited as door 40 nears its upper position as in FIGS. 4 and 12 and the hold-close assembly folds toward shut. This action can optionally be completed by directly pulling door 40 open. However, as discussed next, an easily accessed lift handle may allow a single hand motion to unlock the primary lock and fully open the door.

To ensure a single smooth opening action, lift handle 150 provides a selective link to the hold-close assembly. Lift handle 150 may share a common pivot with lower link 140 at door wire 41, FIG. 5. Lift handle 150 provides separate functions including an easily identified operating handle for door 40. A further function is a link to move the hold-close assembly comprising the primary lock out of its locked over-center condition. In FIG. 5, leg 152 of the lift handle is at or near contact with tip 142 of lower link 140. Pulling up on the lift handle at bar 158 causes leg 152 to force tip 142 to move and lower link 140 to rotate about wire 41 of the door to the position of FIG. 6 against a bias from door spring 65. Bar 158 is an operable interface to the primary lock. The present discussion is directed to the primary lock structure while the second lock 160 shown is discussed below. Door wire 41 remains substantially fixed as a rotation axis through this initial unlocking motion since door 40 does not substantially move yet. As seen in FIG. 6 the hold-close assembly is in an unstable intermediate position. The hold-close assembly will continue to fold up to the position of FIG. 7 under just the bias of raising door 40, see also FIGS. 11 and 12. It is no longer required to directly rotate lower link 140 by lift handle 150 in this stage since the hold-close assembly is now unlocked. Therefore, lift handle 150 can have an end stop to limit its upward or actuating motion. As best seen in FIGS. 3 and 4, leg 153 contacts door 40 to hold lift handle 150 from rotating past a predetermined position. Thus, lift handle 150 is relatively fixed to door 40 between FIGS. 3 and 4 keeping the handle and door under close control. In FIG. 4, bar 158 is spaced from hinge 22 and thus cage 10 end, see also FIG. 12. This function of the end stop limit keeps bar 153 away from the cage for free access and full motion of the gripping lift handle. Without such a stop, for example, bar 158 may run into or too close to hinge area 22, FIG. 4, before the lifting stroke is completed. So in summary, a single upward motion on lift handle 150 disengages the primary lock and lifts door 40. The lift handle may take various forms including edges, extensions, or any other feature that can be operated by a user. It may be a separate structure from the upper and lower links as described here or be a part of either link for example where the hold-close assembly is directly pressed as described earlier.

Other sources of holding or locking force may be used in addition to or instead of the primary lock. As shown, secondary or second lock 160 is fitted to the trap to provide an optional redundant locking action. The lock may comprise a spring wire form as shown or other selectively engageable structures and forms. In the simple, low cost wire form shown it is lightweight while maintaining a spring bias force in its operative locked position. This ensures it operates quickly with low inertia and will not be jarred out of place, for example, if the trap is dropped and/or inverted. In the prior art, certain locking elements are held in place by gravity and are subject to displacement under impact or other events.

Second lock leg 164 forms a detent or equivalent structure and prevents the hold-close assembly from moving rearward or otherwise allowing the primary lock to disengage. This is the second lock position of FIG. 1 and dashed line in FIG. 2. In this manner, the primary lock cannot be unlocked by exclusive action on the primary lock only. To release the second lock, it is pressed at bar 161 to the solid line lowered position of FIG. 2 at position 161b. Bar 161 is an operable interface to the secondary lock. The hold-close assembly is then able to move rearward against the bias of spring 65 to release the primary lock of the assembly. The assembly then can be moved up to and past the intermediate position of FIG. 3.

Second lock 160 includes pivotal mounting 165 which may be upon a common cage pivot at door hinge 43. Upper segment 163 normally presses down on a wire on the top of cage 10 as seen in FIGS. 1, 2 and 3. The corner formed by adjacent segment 162 confines the second lock wire to the cage at its pivotal mounting 165. Therefore, the second lock deflects about the wire at 163 when pressed downward to the solid line in FIG. 1.

Second lock 160 can rotate freely upward about hinge 43 without being deflected, as shown by dashed lines 160a in FIG. 3. When door 40 moves up toward the open position of FIG. 4, the door contacts the second lock to push it to and past the 160a position. The second lock thus can follow the door upward without interfering with the door action. In contrast, the second lock is torsionally held to the cage in a downward direction in FIG. 2—see also FIGS. 1 and 9, so that second lock 160 is resiliently pressing the hold-close assembly from below, at hinges 24 and 144 of the hold-close assembly in FIGS. 1, 5 and 9 in the locked door condition.

During the door closing cycle the hold-close hinge area 24, 144 limits upward motion of the second lock against segment 169, FIG. 2. The hold-close hinge area slides along the long arm 168 of second lock 160, FIGS. 3, 6 and 7, starting at the position of 160a, dashed line of FIG. 3 as the second lock is deflected about corner 162, 163. When the hold-close assembly unfolds to the position of FIG. 2 leg 164 is clear of the hinge area and the second lock snaps up to rebound to the locked position. The hinge area is noted as being either upper link structure 24 or lower link bar 144. Which one of these contacts the second lock may depend on how relatively wide the second lock is or the particular configuration of the hinge designs, as best seen in FIG. 5. Second lock 160 may operate on areas of the hold-close assembly other than the hinge area, for example vertical segments of lower link 140 or openings or edges in upper link 20.

As seen in FIG. 9, second lock bar 161 and lift handle bar 158 are similar in shape and near to each other. The two bars may be considered to be adjacent each other in the context that a single hand can grasp or operate upon both simultaneously. Accordingly, the bars are spaced nearby, for example less than 8 inches apart, to be reasonably operable by a single hand. The bars are preferably spaced by not more than 3 inches to be comfortably operable as described. The second lock can therefore be disengaged at the same time as the lift handle is raised. More precisely, as seen in FIGS. 9 to 12, bars 158 and 161 are near each other such that a single hand can squeeze bar 161 toward bar 158 with the hand maintaining a non-changing position on bar 158 through a door lifting action. Also compare FIGS. 2 and 3; bar 161 is held pressed in a largely stationary position relative to cage 10 as bar 158 is raised whereby the two parts are squeezed together to become at a similar level. This action will disengage second lock 160 and free lift handle 150 to disengage the primary lock. The squeezing motion is intuitively combined with lifting of bar 158 whereby door 40 opens to the set position of FIG. 12. Second lock 160 may be constructed from spring wire for example of a diameter between 0.05 and 0.07 inch. It requires only a light pressing force for example less than one pound to disengage. As described a single comfortable continuous action by a single hand can unlock two separate locks and also open the door to the set position. The addition of a second lock has minimal effect on the motions needed for one-handed set operation of the trap. At the same time, the second lock disengagement is a separate mechanical action that is very unlikely to occur by accident. Preferably the actions herein are low friction, door spring 65 is of not excess strength and latch 30 action is smooth so that the weight of the trap holds it down against the upward force on lift handle 150 through a full set operation. Then there is no need for a second hand to hold the trap while setting occurs. This successful operation has been empirically and reliably demonstrated.

As seen in the drawing figures, the hold-close assembly in the preferred embodiment acts on front door 40 entirely through pivoting motions. With the inclusion of second lock 160 there is a light sliding during the door closing action between the hold-close assembly and second lock arms as discussed above. However, this sliding force is preferably light enough that the door can close and double lock even if the door is deliberately lowered very slowly. The hold-close assembly also has an advantage of minimal reciprocating weight. The upper and lower links are simple and lightweight. Stop limit 145 is a small single rigid loop extension and is the only structure that rotates beyond hinges 24 and 144. With low weight, the door will close rapidly and will have reduced bounce upon reaching its closed limit stop at loop 145. With the inclusion of second lock 160, any bounce of the door or lock assembly is virtually eliminated. Specifically, when leg 164 snaps in place any rebound of the upper and lower links will be stopped entirely by the second lock. The result as demonstrated is a solid action that both sounds and is secure.

Lift handle includes stops at leg 152 against door wires 48, FIG. 9, to hold the lift wire away from door 40 for practical finger access. Accordingly, a close position limit stop additional to stop 145 is at the interaction of lower link tip 142 and lift wire leg 152. This interaction is relatively close to the pivot of wire 41 and thus may not be as solid as the stop from loop 145 which is farther from its respective pivot, although it can function alone as a stop and these relations may be adjusted. Another close limit stop may be provided by second lock 160. For example, an upward leg may be in front of upper link 20 to form a U shape; for example, segment 169 extending upward rather than forward. The front leg can provide a solid close limit stop as second lock snaps into place. As described herein there are at least three structures that can together or alone provide a close limit stop. Regarding the primary and secondary locks, if the primary over-center lock is by accident or intention not engaged upon door closing the second lock can by itself lock door 40 shut. The various redundant structures thus ensure reliable function.

Latch 30 extends downward from the cage top and is pivotally attached to or near the cage ceiling at pivot 32, FIGS. 1 to 4. See also FIGS. 13 and 14. Preferably the latch extends inward to the enclosure of the cage as shown with no substantial external elements. This preserves a compact structure for the trap. Latch pivot 32 preferably fits to wire 13 of cage 10 by partially surrounding the wire. Latch 30 may include slot 32a extending further past pivot 32, FIG.

Figures 13, 14:
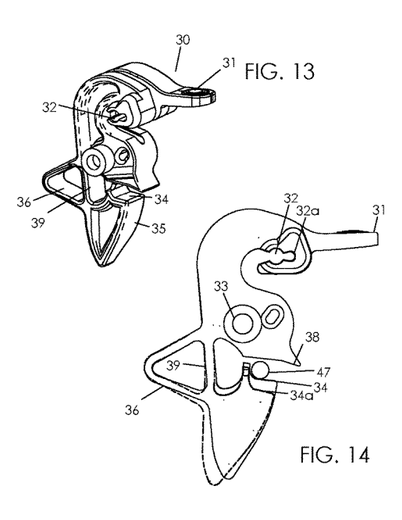
FIG. 13 is a side, rear, perspective view of a latch.
FIG. 14 is a side elevation view of the latch of FIG. 13 including a deflected condition in phantom.

14. If the latch is made from a resilient material such as Delrin pivot 32 can expand slightly to allow a snap fit of the latch to the cage wire. Link pivot 33 pivotally connects to lateral arm 95 of trip link 92. Shelf 34, or equivalent structure, selectively engages wire 47 of front door 40, FIG. 4, under the bias of door spring 65 and the weight of the door. Tab 31 provides a structure to directly and conveniently rotate latch 30 to release the trap from the set position. For example, if the trap is set and is to be transported or stored it may be desirable to do so with the door closed. The quick release also provides an effective pre-purchase demonstration of the trap's improved function.

Below shelf 34 is cam 35 on an underside of the shelf. Moving from the position of FIG. 3 toward the position of FIG. 4 as front door 40 is raised, lateral wire 47 of the door contacts and slides upward along cam 35 to pivotally deflect the latch. Cam 35 preferably acts against the motion of door 40 at a shallow angle, for example, an angle less than about 30° as shown and further preferably less than about 45° or other angle consistent with a smooth, reliable and continuous raising and latching motion of door 40, based on empirical observations. When shelf 34 becomes aligned with the wire the latch snaps into position under bias of door spring 65 to hold the door open. Extension 38 provides an upper limit to the position of door wire 47. Extension 38 includes an underside angle as shown to create a cam action to draw the latch rearward so that the latch reliably engages wire 47. In the absence of extension 38 wire 47 may move past and above the notch with shelf 34 if door 40 is opened very rapidly. This latching action is repeatable for all manner of use; for example, it is near impossible that the latch will partially engage or engage too firmly.

Latch 30 may include a cam release action whereby the latch releases door 40 if the door is forcibly closed. For example, someone may accidentally step on door 40 when it is set and extended open as in FIG. 12. In prior traps, this action can bend the door or damage the latch. In FIGS. 13 and 14 a central portion of the latch includes resilient ribs 36 and 39. When door 40, represented by wire 47 in FIG. 14, is forced downward the lower portion of latch 30 deflects as shown in dashed lines. Shelf 34 becomes angled into the position of 34a until wire 47 slides off the shelf. Vertical rib 39 cooperates with two ribs 36 to create a stable but flexible triangle that can deflect a lower portion of the latch while keeping the lower portion properly positioned relative to the other parts of the latch. Other resilient segments or areas of the latch may provide deflection.

Latch 30 is preferably of molded plastic, for example, low friction Delrin, whereby the features of the latch can be included in a single part while the actions at cam 35 and elsewhere are smooth, resilient, and efficient. Delrin or equivalent material also is less susceptible to changes in friction properties with weather exposure than metal on metal; therefore, the release action will be repeatable. Other latch materials are contemplated such as cast or formed metal including coated metals. Alternatively, a rotational locking cam pivoted to latch 30 or equivalent structure may include low operating angles to provide equivalent low latch engagement force.

With the latching structures described above the latching force is relatively low. For example, the lifting force on lift handle 150 to overcome door spring 65 and the weight of door 40 may be a maximum of about 1 lb on an exemplary 7"×8" trap. The added force to engage and deflect latch 30 may be about 0.15 lb., or about 15% of the lifting force as measured in a working model. Preferably, it will not exceed about 50% of the lifting force or more generally not to exceed about 1 times the lifting force. Along with the previously discussed features of the hold close assembly and door, upper link 20 and/or door 40 can be lifted to set with a light enough force that it is not required to hold down the cage during setting while the door still trips faster than many prior conventional designs. Optionally, a stiffer door spring 65 or similar may be used.

A captured animal will naturally react as the door is tripped. To an extent that such reaction has any effect it will be later in the door closing cycle. The low friction wedging action of the hold-close assembly will have increasing force on door 40 as described above and the mechanical advantage and speed rise toward the spread condition of FIG. 1. The animal is therefore especially unlikely to successfully resist the closing action even if it can manage to act upon the door from the distant rear position from which the tray is tripped.

Door spring 65 is a torsion spring. It undergoes preferably less than 90° angle change between the open position of FIG. 4 and the closed position of FIG. 2. Such a spring has a relatively flat force profile wherein the end force, FIG. 2, remains sufficient to securely engage the primary over-center lock. Spring 65 is compact and visibly well integrated to the trap assembly with the coil of the spring being tucked near hinge 22, FIG. 1. A feature that speeds closing is the light weight and short rotating moment arm of upper link 20 and lower link 140. Further upper link 20 includes openings as shown to reduce the rotating mass of the component. With a less efficient design as common in the prior art, a stiff closing spring is used. This forceful solution requires a high effort setting procedure. Door 40 is a lightweight mesh material. Optionally, sheet steel or other materials may be used for door 40. A stiff plastic sheet has also been demonstrated to be effective as a front door and will work well as long as there are no edges accessible for biting by the occupant.

Figure 15:
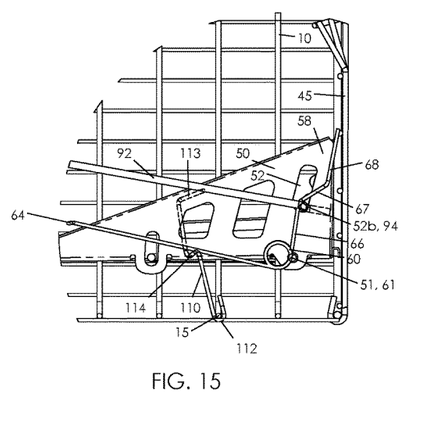
FIG. 15 is a detail side elevation view of a trip tray assembly in a low force setting.
Figure 16:
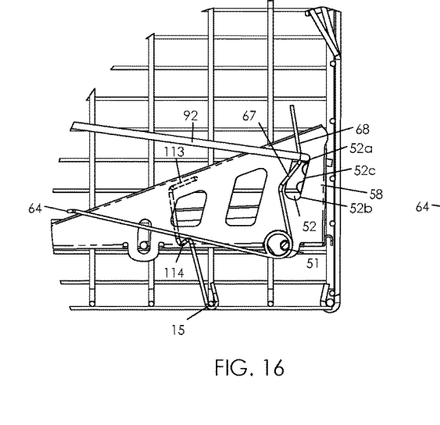
FIG. 16 is the view of FIG. 15 with high trip force setting selected.
Figure 17:
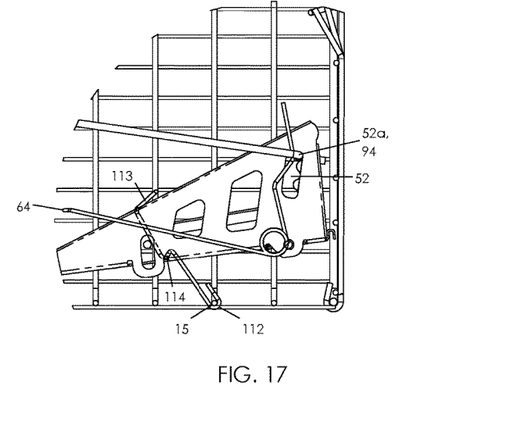
FIG. 17 is the view of FIG. 16 with the tray moved to a tripped position.

Trip link 92 preferably connects latch 30 to a rear of trip tray 50 at leg 94, FIGS. 15 to 17. See also FIG. 18. This link is a direct connection with no intermediate links or sliding contacts. As shown trip link 92 is of a largely straight rod form. The trip link fits to slot 52 in tray flange 58, FIG. 18. Flange 58 is preferably formed as a bend in the sheet metal of trip tray 50. Slot 52 includes at least one recess, detent, or stable pivot location for the link. As shown in the drawings, there are three such available detents for pivot locations, including the upper one 52a used in most of the drawing figures as well as center pivot 52c and lower pivot 52b. Optionally, slot 52 may form a simple hole or equivalent structure for a non-adjustable design.

Tray spring 60 preferably biases the various set and trip parts toward the set position of FIGS. 15 and 16 as it pushes link bar 92 to the right in these Figures. Since there is minimal friction in the system this single spring can perform these multiple functions. When the animal steps up on the trip tray the tray pivots downward about axle 61 at tray pivot 51. Tray flange 58 or equivalent structure moves forward to push trip link 92 to the left. Front end 64 of the tray spring is mounted or connected to cage 10 to bias the tray assembly relative to the cage. After the front door closes to the position of FIG. 1 the tray will rebound to the upper position under this bias with the corresponding latch position as the animal moves off the tray within the trap. As shown, a single tray spring 60 biases both the latch and the trip tray through trip link 92. These parts will preferably move in unison. Optionally, one or more set springs may be at the tray location or elsewhere along the cage, latch, trip link and tray assembly.

As the occupant moves around the tray will toggle up and down. This has no direct effect on the occupant. The repeated tray motions when occupied may also be used to provide trip and occupied signals through further devices such as a radio transmitter, visual signals such as a flag, etc. (not shown). Optionally, there may be a means to hold the down position of the tray when the door is closed.

An adjustable force feature is shown in FIGS. 15 to 17. This is one function of tray spring 60. Tray spring 60 presses link bar leg 94 through force from its opposed end 64 and pivot axle 61. Leg 94 in turn presses tray 50 toward its upper position of FIG. 15. In FIG. 15, tray spring 60 includes an upper arm comprising a lower section 66, mid-section 67 and upper segment 68. Mid-section 67 provides a cam to deflect spring 60 as the link bar moves. Comparing FIGS. 15 and 16, tray 50 is in a same position while tray spring 60 is deflected toward end 64 with a higher pre load on its upper arm in FIG. 16. It follows that the trip force is higher in FIG. 16 than in FIG. 15. A middle position includes link bar 92 being in center pivot 52*c*, and on a central part of spring segment 67 with an intermediate preload force. Spring 60 presses link bar 92 in the selected pivots 52*a* to 52*c* to maintain a selected preload and trip force detent or equivalent position in slot 52. Tray spring 60 therefore provides the multiple functions of biasing latch 30 to engage door 40, bias tray 50 toward its upper position, adjust a trip force, and hold a selected force configuration.

Figure 18:
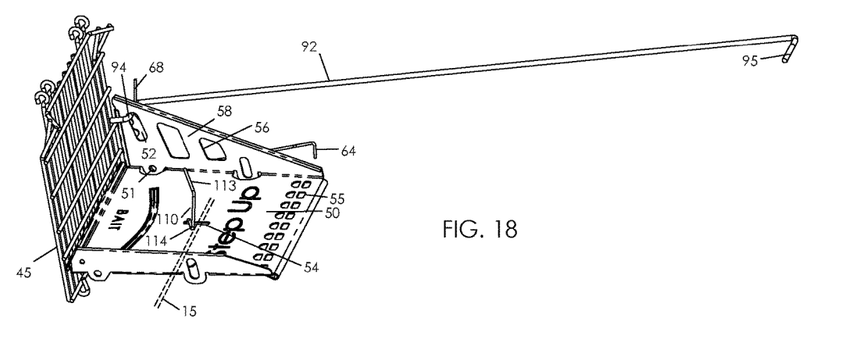
FIG. 18 is a top perspective view of a tray assembly including a trip hook in a rest position.
Figure 19:
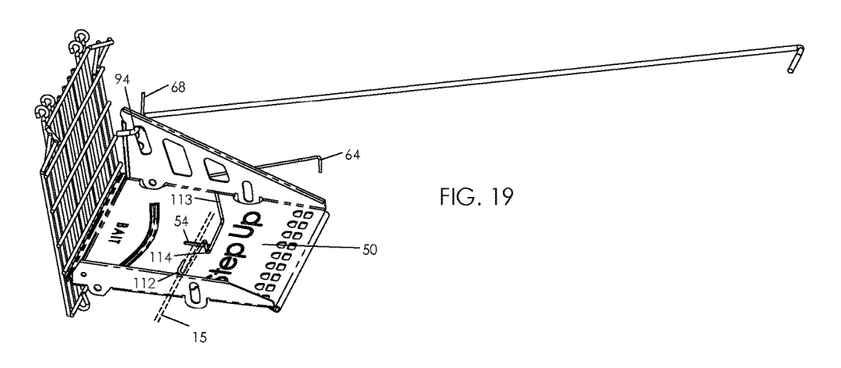
FIG. 19 is the view of FIG. 18 with the tray and trip hook in a tripped position.
Figure 20:
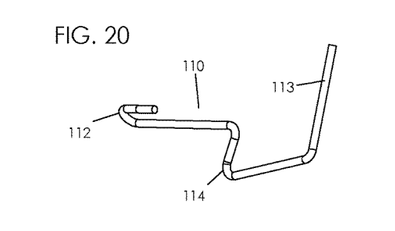
FIG. 20 is a top rear perspective view of a trip hook.

A further structure to adjust the trip force may include moving the mounting of front spring end 64 upon cage 10. In FIG. 18 spring end 64 can be seen. It mounts preferably to a long, horizontal, wire of cage 10. See also FIG. 8. If desired this mounting location can be changed to hook to a higher or lower cage wire or other structure. This will change the deflection and preload of spring 60. The trip force can thus be adjusted by one or both of moving spring front end 64 of one spring leg or moving link bar leg 94 against another spring leg. Optionally, spring end 64 may mount non-movably to forward arm 63.

As seen in FIG. 18, tray 50 may include openings 55 to reduce the reciprocating mass of the tray, especially useful with the larger motion away from the pivot hinge at 51. Side openings 56 also reduce mass and provide an improved view of bait on the tray. With a low mass tray, it will resist false trips when the trap is reasonably shaken or moved. The trip action is efficient whereby the trap can operate reliably with a trip force measured near a front of the tray of about 70 grams or less which can catch even small birds. However, the trip force can readily be increased as described above or by using a heavier spring to select only heavier targets.

Axle 61, shown in FIG. 1, is preferably mounted slightly spaced forward from the rear of tray 50. In the exemplary trap targeting squirrels and similar creatures, this distance is about 0.5 to 1 inch. Other dimensions may be used for different sized target animals or cages. This is to improve stability upon vertical shaking. The portion of tray 50 rearward of axle 61 provides a partial counterweight to the longer cantilevered portion forward of the axle. There is then less inertia to tend to pivot the tray as the cage is shaken vertically. Such shaking can occur from an animal investigating the trap from outside or from moving the set trap. This can be especially useful when the trap is to be placed in a difficult to access area whereby pre-setting it may be most convenient. With the pivot location as shown tray 50 is elongated front to back, both forward and rearward from axle 61 to ensure the animal cannot over-neck the tray to reach the bait. In the exemplary trap, this length dimension is about 4 to 6 inches although it may normally be different for different trap sizes targeting various animals.

In FIG. 8, axle 61 is shown as an end of a large diameter bent segment 62 of mesh material. Forward arm 63 extends into the cage interior to engage slot 53 of the tray. Slot 53 provides an upper limit stop for the motion of tray 50 while allowing downward trip motion.

In FIGS. 15 to 19 a trip hook 110 is shown. It can be desirable to hang bait above a trip tray to make the bait more visible and to require some extra effort and thus time on the tray to take the bait. As shown herein this mounting adds a supplemental linked means to trip the trap. The hook is linked to tray 50 whereby moving the hook causes the tray to move to trip and close front door 40. Hook 110 includes lower pivot 112 pivotally engaged to wire 15 of cage 10. Upper leg 113 provides a spike or other holding feature to mount bait. As shown leg 113 extends horizontally over tray 50. Corner 114 slidably contacts a face of tray 50. If an animal pulls on the bait the hook will move forward from the starting position of FIG. 18 to the activated position of FIG. 18. Compare also FIGS. 16 and 17. The changing angle about pivot wire 15 will force tray 50 down to disengage latch 30 from door 40. Corner 114 is rounded so it will slide upon tray 50.

Hook 110 provides a redundant way to trip the trap using a bait pulling action of the animal. This can be useful for example when a very light animal is a problem. A user may find that bait is repeatedly missing but the trap or traps are still open. A mouse, small rat or bird, for example, may be stealing it even if these are not the target animal. This has been experienced wherein a single small rat steals bait from more than one trap overnight. Setting a lethal snap trap nearby can be helpful here. But it also can be helpful to directly catch and eliminate the troublesome creature. For example, the rat's weight may be not enough to trip tray 50. But with the biasing force from hook 110 added to the direct weight on tray 50 the trap will trip as the animal pulls the bait. This has been demonstrated. Unlike a simple bait hanger, hook 110 actively cooperates with and links to tray 50 to trip the trap whereby moving either just the tray or just the hook, or both, will cause the trip.

Trip hook 110 can be removed and reinstalled if desired. If tray 50 is moved down as in FIG. 17 and the cage bottom including wire 15 is pushed to deflect upward, or into the cage interior, the loop at pivot 112 can be unhooked from wire 15. Alternatively, the loop can be crimpled around wire 15 for a more permanent installation. Other locations and linkings for the trip hook may be used. For example, it may be mounted behind tray 50 to extend in front of rear door 45 to a distal hook end at atop rear of tray 50. Such a hook would be pivoted to a side wire of the cage to press a rear of flange 58. This approximate flange location is shown at the indication 58 in FIG. 16.

Rear door 45 is fitted to cage 10. Preferably door 45 pivots outward from a bottom hinge. Lock 80 selectively holds the rear door closed by engagement to top plate 71. The operation of door 45 is further discussed in related U.S. Pat. No. 9,730,437.

FIGS. 1 and 8 show a handle 90 of a single loop form in a lowered position. As seen the top bar of the loop has a serpentine or wavy path. This shape facilitates lifting the handle to its operative upright position, not shown. The higher locations of the wavy top bar provide an accessible under-surface to grasp and lift handle 90. The wavy shape also widens the top bar in a noticeable way for increased carrying comfort. Two parallel and adjacent such handles may be pivotally fitted to top plate 71 to provide a more stable and wider support for carrying.

A second mode of carrying the trap is availed by the rearward folding upper and lower links. In the unfolded position of FIGS. 1 and 8 the hold-close assembly is stopped by limit 145 and cannot move further forward. The lower edge of upper link 20, at hinge 24, can then serve as a carry handle. The sheet of upper link 20 can be gripped from behind whereby the trap descends vertically to hang beside the user. The door is actually even more secure when it is pulled this way against stop limit 145 so the trap can be carried with confidence. This is a convenient way to transport the trap, occupied or not, when the door is closed. It is often easier to maneuver through gates, doors, etc, when it does not extend sideways. The fingers remain a normally safe distance from the front door when held this way with the trap occupied.

While the particular forms of the invention have been illustrated and described, it will be apparent that various modifications can be made without departing from the spirit and scope of the invention. It is contemplated that elements from one embodiment may be combined or substituted with elements from another embodiment.

What is claimed is:

1. An animal trap for enclosing the animal, comprising:
   a cage including a top, sides, a front door, a rear, and a bottom to form an enclosure, the top including a ceiling facing an interior of the enclosure;
   the front door pivotally attached at the ceiling including a raised position and a lowered position, the raised position exposing an interior of the cage to allow access into the enclosure, the lowered position confining the interior of the cage to block exit from the enclosure;
   a hold-close assembly connecting the ceiling to the door including a two-bar link with an upper link pivotally attached at the ceiling at a separate and spaced first location from the pivotal attachment of the front door, the upper link pivotally attached to a lower link at second movable location, and the lower link is pivotally attached to the door at a third movable location; and
   a folded condition of the hold-close assembly with the lower link of the hold-close assembly being disposed below the ceiling to extend adjacent to the upper link in the door raised position, the upper link extending rearward from the first location toward the front door pivotal attachment, the lower link extending rearward from the third movable location, the links of the hold close assembly being released to cause the second movable location to move forward as the door moves toward the lowered position including an unfolded position of the hold close assembly wherein the hold close assembly extends from the ceiling down to a lower location of the door.

2. The animal trap of claim 1, wherein the first location and the third location are connected by an imaginary line, the second location moves forward across the imaginary line to a stop limit as the hold-close assembly moves to the locked position, and a primary lock of the hold close assembly is locked in the lowered position of the door wherein the hold-close assembly prevents the door from being forced to rise.

3. The animal trap of claim 2, wherein a lift handle selectively engages the lower link, the lift handle causing the second location to rotate through a predetermined angular distance rearward past the imaginary line to unlock the primary lock.

4. The animal trap of claim 3, wherein the lift handle disengages from the lower link at the predetermined angular distance and the front door is free to move to an upper set position.

5. The animal trap of claim 2, wherein a lift handle rotates along with the lower link.

6. The animal trap of claim 3, wherein at the predetermined position the lift handle rotationally engages a stop to stop motion of the lift handle in relation to the door.

7. The animal trap of claim 6, wherein the lift handle is relatively fixed to the front door after the lift handle engages the door and the lift handle provides a gripping element by which to lift the front door.

8. The animal trap of claim 1, wherein a secondary lock selectively engages the hold-close assembly, the secondary lock including a resilient portion and a leg, the secondary lock biased to selectively engage and lock the leg to the hold-close assembly.

9. The animal trap of claim 8, wherein the secondary lock is deflected by the hold-close assembly as the door moves toward the lowered position, and the secondary lock rebounds to engage the hold-close assembly near the second movable location with a resilient spring force in the door lowered position.

10. The animal trap of claim 9, wherein the secondary lock comprises a spring wire form.

11. An animal trap for enclosing the animal, comprising:
    a cage including a top, sides, a front door at a front cage opening, a rear, and a bottom, to form an enclosure, the top including a ceiling facing an interior of the enclosure;
    the front door pivotally attached at the ceiling including a raised position extending from the pivotal attachment and a lowered position angled toward the bottom, the raised position exposing an interior of the cage to allow access into the enclosure, the lowered position confining the interior of the cage to block exit from the enclosure;
    a primary lock at the cage front, the primary lock including a hold-close structure, the primary lock moving with the front door as the front door moves toward the lowered door position, the primary lock including a link to the door to hold the door in the closed position;
    a secondary lock to selectively restrain the primary lock in a locked condition, the secondary lock having a separate mechanical action from the primary lock wherein the front door cannot freely move from the lowered position to the raised position by exclusive action upon the primary lock; and
    the primary lock and the secondary lock each having an interface with the respective interfaces being at the front cage opening and spaced apart by less than about 8 inches wherein the primary and secondary locks are operable together and simultaneously during a front door raising action.

12. The animal trap of claim 11, wherein the respective interfaces move toward each other to unlock both the primary and secondary locks.

13. The animal trap of claim 11, wherein the primary lock selectively and singly prohibits opening of the door, and the secondary lock provides a redundant locking action to the primary lock.

14. The animal trap of claim 11, wherein the hold-close structure connects the ceiling to the door including a two bar link with an upper link pivotally attached to the ceiling at a separate and spaced first location from the pivotal attachment of the front door, the upper link pivotally attached to a lower link at second movable location, and the lower link is pivotally attached to the door at a third movable location, at least one of the upper and lower links being rotationally biased toward a position corresponding to the front door lowered position, the bias on the at least one link causing the secondary lock to deflect and engage the hold-close structure when the door moves to the lowered position.

15. The animal trap of claim 14, wherein the secondary lock comprises a spring wire structure, and the secondary lock is biased to hold its engaged position in the door closed position.

16. The animal trap of claim 11, wherein the secondary lock includes a lowered position corresponding to the door lowered position, and a raised position corresponding to the door raised position, the secondary lock rotating as a result of rotation of the door.

17. The animal trap of claim 16, wherein the secondary lock moves freely to a lower position, and the hold-close structure slidably contacts secondary lock to deflect the secondary lock to a further lowered position.

18. The animal trap of claim 11, wherein the primary and secondary lock interfaces are spaced part in the locked condition by not more than three inches, and the interfaces move in relation to each other as the secondary lock is unlocked.

19. An animal trap, comprising:
a cage including a top, sides, a front door, a rear, and a bottom to form an enclosure, the top including a ceiling facing an interior of the enclosure;
the front door pivotally attached at the ceiling including a raised position and a lowered position, the raised position exposing an interior of the cage, the lowered position confining the interior of the cage;
a hold-close assembly connecting the ceiling to the front door having bar links including an upper link pivotally attached to the ceiling at a separate and spaced first location from the pivotal attachment of the front door, the upper link pivotally attached to a lower link at second movable location, and the lower link is pivotally attached to the door at a third movable location;
a biasing member for actuating the hold-close assembly to bias the front door into the lowered position;
a lock slidably engaging the hold-close assembly; and
the lock including a detent segment that selectively engages the hold-close assembly to lock the hold-close assembly and the front door in the lowered door position.

20. The animal trap of claim 19, wherein the lower link of the hold-close assembly is disposed below the ceiling positioned to extend adjacent to the upper link in the door raised position, the links of the hold close assembly are opposed about the second movable location, the links being released to pivot as the door moves toward the lowered position including an unfolded position of the hold close assembly wherein the hold close assembly extends from the ceiling down to a lower location of the door, at least one of the upper link and lower link includes an extension, and in the lowered door position the extension is beyond the second movable location in contact with an opposed link to form a stop to limit rotational motion of the links.

* * * * *